United States Patent [19]

Barbee et al.

[11] Patent Number: 4,482,695
[45] Date of Patent: Nov. 13, 1984

[54] POLYAMIDE CONTAINERS HAVING IMPROVED GAS BARRIER PROPERTIES

[75] Inventors: Robert B. Barbee; Roy K. Bass; Burns Davis, all of Kingsport, Tenn.

[73] Assignee: Eastman Kodak Company, Rochester, N.Y.

[21] Appl. No.: 551,397

[22] Filed: Nov. 14, 1983

[51] Int. Cl.$^3$ .............................................. C08G 69/26
[52] U.S. Cl. .................................... 528/208; 528/335; 528/337; 528/347; 528/348; 428/475.5
[58] Field of Search .............. 528/335, 208, 347, 337, 528/348; 428/475.5

[56] References Cited

U.S. PATENT DOCUMENTS

| | | | |
|---|---|---|---|
| 2,158,064 | 5/1939 | Carothers | 528/335 |
| 2,756,221 | 7/1956 | Caldwell | 528/347 |
| 2,875,059 | 2/1959 | Unruh et al. | 528/335 |
| 3,558,565 | 1/1971 | Saotome et al. | 528/347 |
| 4,133,802 | 1/1979 | Hachiboshi et al. | 528/347 |

Primary Examiner—Harold D. Anderson
Attorney, Agent, or Firm—David E. Cotey; Daniel B. Reece, III

[57] ABSTRACT

The present invention provides containers having unexpectedly superior gas barrier properties. The containers are formed from specified polyamides which comprise an aliphatic diamine and a diacid component which comprises a dicarboxylic acid containing a hetero atom.

6 Claims, No Drawings

POLYAMIDE CONTAINERS HAVING IMPROVED GAS BARRIER PROPERTIES

DESCRIPTION

Background of the Invention

The present invention relates to containers which are formed from specifically defined polyamide resins. These containers demonstrate a degree of gas impermeability which has hitherto been unattainable with polyamide containers.

It has been known in the art that, compared to certain other classes of polymers, homopolyamides and copolyamides exhibit relatively good gas barrier properties. Typical prior art polyamides are disclosed, for example, in U.S. Pat. No. 4,261,473. Examples of such polyamides include polycaprolactam (Nylon 6), poly-ω-aminoheptanoic acid (Nylon 7), poly-ω-aminononanoic acid (Nylon 9), polyundecanamide (Nylon 11), polylauryllactam (Nylon 12), polyethylene adipamide (Nylon 2-6), polytetramethylene adipamide (Nylon 4-6), polyhexamethylene adipamide (Nylon 6-6), polyhexamethylene sebacamide (Nylon 6-10), polyhexamethylene dodecamide (Nylon 6-12), polyoctamethylene adipamide (Nylon 8-6), polydecamethylene adipamide (Nylon 10-6) and polydodecamethylene sebacamide (Nylon 12-8).

Containers formed from poly(meta-xylylene adipamide) are also known in the art (see, for example, U.S. Pat. No. 4,398,642). However, these containers do not exhibit the high degree of gas impermeability which is provided by the containers of the present invention. As is apparent from the disclosure of U.S. Pat. No. 4,133,802, this type of prior art polyamide must be subjected to biaxial drawing in order to obtain a film having desirable mechanical and physical properties (in particular, desirable gas barrier properties).

Polyamides prepared from aromatic amino compounds are disclosed in U.S. Pat. No. 3,408,334. The aromatic amines used in these polyamides contain amino groups bonded directly to an aromatic ring. Typical examples of suitable diamines are meta-phenylenediamine, para-phenylenediamine, isomeric diaminoxylenes, etc. The patent further discloses that p-phenylenedioxydiacetic acid and similar compounds can be employed in the preparation of polyamides. The disclosed polyamides are not of the type employed in the resins from which the containers of the present invention are formed. Moreover, the surprisingly and unexpectedly excellent gas barrier properties of the containers of the present invention are neither disclosed nor suggested.

SUMMARY OF THE INVENTION

The present invention provides a container having improved gas barrier properties formed from a polyamide resin comprising the reaction product of (A) an aliphatic diamine having 2 to about 12 carbon atoms, and (B) a dicarboxylic acid component consisting essentially of (i) about 50 to 100 mole percent of a first dicarboxylic acid of the formula $$HO_2CCH_2X(RX)_YCH_2CO_2H$$

wherein X represents —O—, —S—, or

Y is 0 or 1, and R represents an aromatic moiety comprising 6 to about 13 carbon atoms, and (ii) 0 to about 50 mole percent of a second dicarboxylic acid containing up to about 12 carbon atoms.

DETAILED DESCRIPTION OF THE INVENTION

The present invention relates to containers which are formed from specified polyamide resins. The containers of the present invention demonstrate surprisingly and unexpectedly superior gas barrier properties over prior art polyamide containers. As used herein, the term "container" is intended to mean shaped articles formed from specified polyamides, the shaped articles being suitable for use in packaging comestibles. Such shaped articles include sheets and films which are extruded from the polyamides and which may be used as barrier layers, container liners, as components of laminates or other composites, etc. Such shaped articles also include molded containers, such as bottles.

The polyamides from which the containers of the present invention are formed comprise the reaction product of a diamine component and a diacid component. The diamine component comprises an aliphatic diamine having 2 to about 12 carbon atoms. The aliphatic diamines can contain aromatic groups, as long as an alkylene group (e.g., a methylene group) is interposed between an amino group and an aromatic ring. The aliphatic diamines also include cycloaliphatic diamines, such as piperazine. Thus, examples of suitable aliphatic diamines include 1,2-ethylenediamine, 1,3-propylenediamine, 1,6-hexylenediamine, 1,12-dodecylenediamine, piperazine, 1,4-cyclohexanebismethylamine, p-xylylenediamine, m-xylylenediamine, mixtures thereof, etc. The aliphatic diamine preferably comprises 1,6-hexylenediamine, piperazine, p-xylylenediamine, m-xylylenediamine, or a mixture thereof.

The polyamide resins further comprise a diacid component. The diacid component consists essentially of a first diacid and, if desired, a second diacid.

The first diacid comprises about 50 to 100 mole percent of the total diacid moieties present in the polyamide. The first diacid has the formula $$HO_2CCH_2X(RX)_YCH_2CO_2H \qquad (I)$$

In the above formula, X represents —O—, —S—, or

Y is 0 or 1, and R represents an aromatic moiety comprising 6 to about 13 carbon atoms. Suitable R groups include the following:

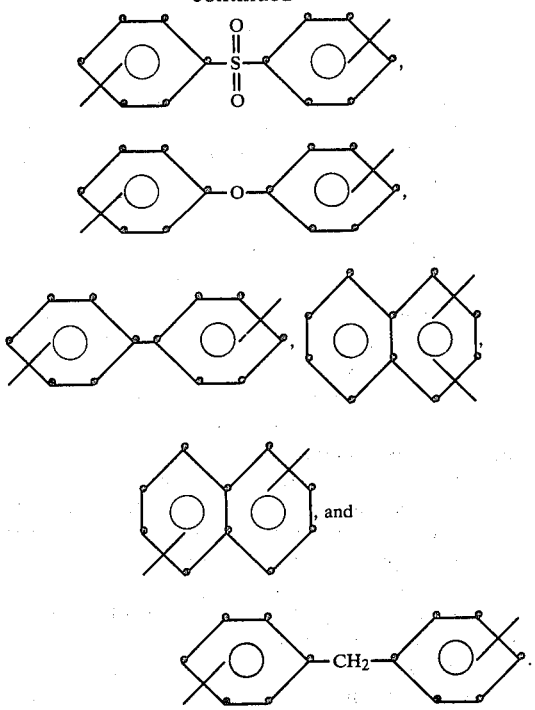

Preferably, the first dicarboxylic acid comprises iminodiacetic acid, oxydiacetic acid, thiodiacetic acid, 1,4-phenylenedioxydiacetic acid, 1,3-phenylenedioxydiacetic acid, mixtures thereof, etc. In especially preferred embodiments, the X group of Formula I represents —O—.

Because it is sometimes difficult to attain high molecular weight polyamides when the first dicarboxylic acid is the sole diacid present in the polyamide resin, it may be desirable to employ a second dicarboxylic acid. When employed, the second dicarboxylic acid is present in an amount up to about 50 mole percent, based upon the total diacid moieties present in the polyamide. The second dicarboxylic acid contains up to about 12 carbon atoms and may be either aliphatic or aromatic in nature. Examples of such diacids include isophthalic acid, terephthalic acid, 1,4-cyclohexanedicarboxylic acid, sebacic acid, succinic acid, adipic acid, etc. Diacids which are preferably employed as the second diacid include isophthalic acid, adipic acid, and mixtures thereof.

The polyamides which are employed in the present invention exhibit an I.V. of about 0.25 to 1.5 (preferably, about 0.4–1.2). The I.V. is measured at 25° C. in a 60/40 by weight mixture of phenol/tetrachloroethane at a concentration of 0.5 grams per 100 ml. Polymers having an I.V. within the range specified above are of sufficiently high molecular weight to be used in the formation of the containers of the present invention.

The polyamides which are employed in the present invention are synthesized by methods generally known in the art for producing polyamides. The diamine and diacid components are preferably reacted in approximately stoichiometric quantities. Diacid chlorides, esters, etc., can suitably be used. A solvent may be used in the preparation of the polyamide.

In general, the reaction involves heating stoichiometric quantities of the diamine and diacid components in the presence of a small amount of water and in an inert atmosphere with stirring. A slight excess of the diamine may be desirable. Water is allowed to distill as the temperature is raised so as to facilitate reaction between the diamine and the dicarboxylic acid and to keep the product fluid. Temperatures in the range of about 180° to 295° C. may be employed, with the preferred range being about 200° to 270° C. Preferably, the final stages of the reaction are conducted under a vacuum. The polymerization reaction is typically conducted for a period of time of about 2 to 10 hours. The preparation of the polyamide does not require the use of a catalyst, and catalysts typically are not employed during the reaction period. However, suitable catalysts which have been disclosed in the literature can be employed if desired.

It is often desirable to employ a procedure which involves the preparation of a salt from the diacid and the diamine. By means of such a procedure, better control of the stoichiometry can be obtained. The desired salts are well known in the art and can be prepared by heating the diamine and diacid to reflux temperature in the presence of a solvent. The salts which are formed represent an ionic combination of the diamine and the diacid. The salts can be isolated in solid form and have well-defined melting points, values for which have been recorded in the literature. The salts which are obtained can be heated with stirring so as to melt the salt, thereby forming a polymeric product accompanied by the formation and release of water. Preferably, as the salt is heated to its melting point, a small amount of water (up to about 10% by weight, based upon the weight of the salt) is added to the reaction system to aid in the removal of oxygen from the system. The preparation of the polyamide proceeds as described above.

Of course, suitable additives, such as dyes, pigments, plasticizers, fillers, antioxidants, stabilizers, etc., may be employed in conventional amounts. Such additives may be added directly to the reaction or may be added to the final polymer.

The polyamides described above may be formed into the containers of the present invention by conventional plastic processing techniques. For example, sheets, films, and other like structures can be formed by well-known extrusion techniques.

Film or sheet material made in accordance with the present invention is strong, flexible, and clear. Such materials can be formed into articles such as wrappers, bags, and the like. The polyamides may also be used to form a laminating layer between two or more permeable layers of film. It may be desirable to include a tie layer (e.g., a polyolefin-based tie layer, a polyesteramide tie layer, etc.) between the permeable layers of film and the layers of the polyamides described above. The polyamides described above may also be used for dip coating containers from a polymer solution in order to improve the barrier properties of the package.

Molded containers can be made from the above-described polyamides by compression molding, blow molding, or other such molding techniques, all of which are well known in the art.

Containers may also be formed by coextruding (e.g., in the form of a "pipe" or otherwise) a layer of a polyamide specified above together with some other suitable thermoplastic resin. Especially useful for coextrusion purposes is a polyamide resin prepared from diglycolic acid and m-xylylenediamine. Again, one or more tie layers may be desirable.

Resins which are suitable for forming laminates or coextruded articles in conjunction with the polyamide resins disclosed herein include polyethylene terephthalate, poly(1,4-cyclohexylene terephthalate), and other such well-known polyesters.

The above-described containers of the present invention exhibit low oxygen and carbon dioxide permeabilities relative to prior art polyamide materials. Typically, containers formed from the polyamides of the present invention exhibit an oxygen permeability of less than about 1.0 (preferably, less than about 0.7), measured as cubic centimeters permeating a 1 mil thick sample, 100 inches square, for a 24-hour period under an oxygen partial pressure difference of 1 atmosphere at 30° C. Thus, the above-described containers of the present invention are ideally suited for protecting comestibles, such as foodstuffs (especially carbonated soft drinks), medicines, and like substances.

This invention will be further illustrated by the following examples although it will be understood that these examples are included merely for purposes of illustration and are not intended to limit the scope of the invention.

EXAMPLE 1

This Example describes a polyamide prepared from diglycolic acid and m-xylylenediamine and the formation of a container therefrom.

A salt of diglycolic acid and m-xylylenediamine was prepared by combining 268.0 g (2.0 moles) of diglycolic acid with 277.4 g (2.04 moles) of m-xylylenediamine. The diamine was added slowly to a stirred solution of diglycolic acid in ethanol. The reactants were heated at reflux for four hours. The source of heat was then removed, and the reaction mixture was allowed to stand overnight. The salt which precipitated was collected on a filter and was purified by dissolving the salt in distilled water and precipitating it with ethanol.

A 135.0 g sample of the salt prepared as described above was heated with stirring under nitrogen for two hours at 210° C., during which time water was allowed to distill out of the reaction system. A vacuum (less than 0.5 mm Hg) was applied to the reaction system for six hours, during which time a viscous product formed. The source of heat was removed, and the product was exposed to a nitrogen atmosphere and allowed to cool and solidify. The product, having an inherent viscosity of 0.5, was ground so as to pass a 3 millimeter screen. The ground material was dried at about 75° C. under a vacuum of about 1.0 mm Hg and was extruded at 190° C. into a film about 5 mils thick. The film exhibited an oxygen transmission rate of about 0.10 cc.mil/100 in.$^2$.24 hr.atm. The film had a tensile strength of about 5,000 pounds per square inch and an elongation of about 2%.

EXAMPLE 2

This Example describes a polyamide prepared from 1,3-phenylenedioxydiacetic acid and piperazine and a container formed therefrom.

A salt of 1,3-phenylenedioxydiacetic acid and piperazine was prepared by dissolving 87.9 g (1.02 moles) of piperazine in ethanol and adding this solution slowly to a stirred solution of 226 grams (1.0 mole) of 1,3-phenylenedioxydiacetic acid in ethanol. The reaction was heated at reflux for four hours and was then cooled. The precipitated salt was collected on a filter. The salt was recrystallized by dissolving the salt in distilled water at elevated temperatures and then adding ethanol to precipitate the salt.

The recrystallized salt (81.5 g; 0.26 mole) was heated with stirring under nitrogen at 240° C. for one hour, during which time water was distilled from the reaction system. Vacuum (less than 0.5 mm Hg) was applied for seven hours, during which time a viscous product was formed. The source of heat was removed, the reaction system exposed to a nitrogen atmosphere, and the product was allowed to cool and solidify. The product, having an inherent viscosity of 0.6, was ground to pass a 3 millimeter screen. The ground material was dried at 75° C. under a vacuum of about 1.0 mm Hg and was then extruded at 250° C. into a film about 5 mils thick. The film exhibited an oxygen transmission rate of about 0.2 cc.mil/100 in.$^2$.24 hr.atm. The film had a tensile strength of about 11,000 pounds per square inch and an elongation of about 4%.

EXAMPLE 3

This Example illustrates the preparation of a copolyamide from 50 mole % 1,3-phenylenedioxydiacetic acid, 50 mole % 1,4-phenylenedioxydiacetic acid, and piperazine. This Example further illustrates the formation of a container from this polyamide.

The salts of the diamine and each dicarboxylic acid were prepared separately by combining each diacid with 2% excess diamine. Specifically, piperazine was dissolved in ethanol and was added slowly to a stirred solution of the diacid in ethanol. The reaction mixture was then heated at reflux for two hours, cooled, and the precipitated salt was collected on a filter.

The salts (54.6 g (0.175 mole) of each salt) were combined and heated under nitrogen with stirring at 260° C. for 60 minutes, during which time water was allowed to distill from the reaction. Vacuum (less than 0.5 mm Hg) was applied for seven hours, during which time a viscous product was formed. The source of heat was then removed, and the product was subjected to a nitrogen atmosphere. The product was allowed to cool and solidify. The solid product, having an inherent viscosity of about 0.64, was ground to pass a 3 mm screen. The ground material was then dried at 75° C. under a vacuum of about 1.0 mm Hg and was extruded at 260° C. into a film about 5 mils thick. The film had an oxygen transmission rate of about 0.30 cc.mil/100 in$^2$.24 hr.atm. The film had a tensile strength of about 10,000 pounds per square inch and an elongation of about 4%.

EXAMPLE 4

This Example illustrates the preparation of a polyamide from 1,3-phenylenedioxydiacetic acid and m-xylylenediamine.

A salt of the dicarboxylic acid and the diamine was prepared by slowly adding 139 grams (1.02 moles) of m-xylylenediamine to a stirred solution of 226 g (1.0 moles) of 1,3-phenylenedioxydiacetic acid in ethanol and distilled water (3:1 by volume mixture). The reactants were heated at reflux for two hours and cooled. The precipitated salt was collected on filter paper. The salt was recrystallized by dissolving the salt in distilled water at elevated temperature and then precipitating the salt with ethanol. The salt (181.0 g, 0.5 mole) was heated with stirring under nitrogen at 260° C. for two hours. Vacuum (less than 0.5 mm Hg) was applied for five minutes, during which time a viscous product formed. The reaction system was subjected to nitrogen, removed from heat, and allowed to cool. The solid product, having an inherent viscosity of 1.06, was ground to pass a 3 millimeter screen. The ground material was dried at 75° C. under a vacuum of about 1.0 mm Hg and was extruded at 260° C. into a film about 5 mils thick. The film had a gas transmission rate of about 0.25 and 1.70 cc.mil/100 in$^2$.24 hr.atm respectively for oxygen and carbon dioxide. The film had a tensile strength of about 10,000 pounds per square inch and an elongation of about 5%.

EXAMPLE 5

This Example illustrates the preparation of a polyamide from 1,6-hexylenediamine and 1,3-phenylenedioxydiacetic acid. A 70% aqueous solution of 1,6-hexylenediamine (16.93 g of the diamine) and 1,3-phenylenedioxydiacetic acid (22.60 g of the diacid) were stirred at room temperature for 16 hours. The salt which formed was removed by filtration, washed twice with cold ethanol, and dried in air. The salt was heated for 90 minutes at 230° C. under nitrogen with stirring. The temperature was then increased to 70° C., and a vacuum of 0.2 mm Hg was applied for one hour. The source of heat was removed, and the reaction mixture was let down to atmospheric pressure with nitrogen. The polyamide product had an inherent viscosity of 0.88. The polymer was heated and pressed into a film. The film had an oxygen transmission rate of about 0.67 cc.mil/100 in.$^2$.24 hr.atm.

A second polyamide of 1,6-hexylenediamine and 1,3-phenylenedioxydiacetic acid was prepared by a procedure similar to that described above. The polymer had an inherent viscosity of about 0.95. The polymer was injection molded into tensile and impact bars. The polymer exhibited a tensile strength of about 11,600 pounds per square inch and an elongation of about 11%. The material had an unnotched Izod impact strength of about 9.4 ft-lb and a notched Izod impact strength of about 0.32 ft-lb. The flexural strength was about 17,930 pounds per square inch, and the flexural modulus was about 556,000 pounds per square inch.

EXAMPLE 6

This Example illustrates the preparation of a polyamide from 1,6-hexylenediamine and diglycolic acid and the formation of a container therefrom.

A 70% aqueous solution of 1,6-hexylenediamine (18.23 g of the diamine) and 20 ml of ethanol was added to a solution of 13.4 g of diglycolic acid and 110 ml of ethanol with stirring. The reaction mixture was heated for 1.5 hours under reflux and was then allowed to stand overnight. The salt which formed was removed by filtration, washed with cold ethanol, and dried under nitrogen. The salt was heated for 30 minutes at 200° C. The temperature was then increased to 225° C. and a vacuum of less than 0.5 mm Hg was applied for two hours. The source of heat was removed, and the reaction mixture was let down to atmospheric pressure with nitrogen. The polymer product had an inherent viscosity of 0.69. A film of the polyamide exhibited a surprisingly low oxygen transmission rate.

When compared with a typical polyamide resin, such as Nylon 6-6, the advantages provided by containers formed from the polyamides specified herein, as demonstrated in Examples 1-6, become apparent. Typical polyamides, such as Nylon 6,6, commonly demonstrate oxygen permeabilities on the order of 4 cc.mil/100 in.$^2$.24 hr.atm. It can readily be seen that the results of Examples 1-6 are far superior to those of such prior art containers. In addition, other prior art polyamides, such as those formed from adipic acid and meta-xylylenediamine, also exhibit less advantageous gas barrier properties than the containers of the present invention. For example, this type of prior art resin produces a container having an oxygen permeability of, at best, about 0.6 cc.mil/100 in.$^2$.24 hr.atm, whereas the containers of the present invention, as illustrated by Examples 1-6, easily match or are superior to such prior art containers.

While the invention has been described in detail with particular reference to preferred embodiments thereof, it will be understood that variations and modifications can be effected within the spirit and scope of the invention.

We claim:

1. A container having an oxygen transmission rate of less than about 1.0 cc.mil/100 in.$^2$.24 hr.atm which is formed from a polyamide comprising the reaction product of
    (A) m-xylylenediamine, p-xylylenediamine, or a mixture thereof, and
    (B) oxydiacetic acid, 1,4-phenylenedioxydiacetic acid, 1,3-phenylenedioxydiacetic acid, or a mixture thereof.
2. The container of claim 1 wherein said oxygen transmission rate is less than about 0.7 cc.mil/100 in.$^2$.24 hr.atm.
3. The container of claim 1 wherein said polyamide comprises the reaction product of oxydiacetic acid and m-xylylenediamine.
4. The container of claim 1 wherein said container is a film formed from said polyamide.
5. The container of claim 1 wherein said container is a coextruded article comprising said polyamide.
6. The container of claim 1 wherein said container is a laminated article comprising said polyamide.

* * * * *